Sept. 22, 1931.  C. S. BRAGG ET AL  1,824,032

POWER ACTUATOR

Original Filed April 16, 1925

Caleb S. Bragg
Victor W. Kliesrath
INVENTORS
BY Louis Prevost Whitaker
ATTORNEY

Patented Sept. 22, 1931

1,824,032

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Original application filed April 16, 1925, Serial No. 23,459. Divided and this application filed November 13, 1926. Serial No. 148,157. Renewed January 7, 1929.

Our invention consists in the novel features hereinafter described, reference being had to the accompanying drawings which show one form in which we have contemplated embodying our invention, selected by us for purposes of illustration, and the said invention is fully disclosed in the following description and claims.

Our invention is an improvement in power actuators adapted to be operated by differential pressures under the control of suitable valve mechanism, and our actuator is especially adapted to installations where an extremely easy action of the valve mechanism is important. In carrying out our invention, we prefer to employ a valve of the piston type located in the hub of the piston of the actuator, and movable with and with respect to the piston, the said valve being provided with cylindrical valve portions adapted to be brought into substantial registration with ports in the piston, when the valve is in neutral position, the cylindrical portions being located on opposite sides of an outlet chamber preferably formed in the valve and communicating with a source of suction as the suction passage of an internal combustion engine, the said cylindrical valve portions and the outlet chamber being so located with respect to the piston ports, as to place the piston ports communicating with the cylinder on opposite sides of the piston in communication with each other and with said outlet chamber when the valve is in normal or neutral position, to equalize pressures on opposite sides of the piston, and produce an equal state of rarification on both sides of the piston. The present case is a division of application Serial No. 23,459, filed April 16, 1925.

Our invention consists in the novel features of construction and combination of parts hereinafter described and particularly pointed out in the claims, and in the accompanying drawings we have illustrated one form of the invention adapted for use in operating brake mechanism and other mechanisms in automotive vehicles of various kinds.

Referring to the drawings.

Figure 1:
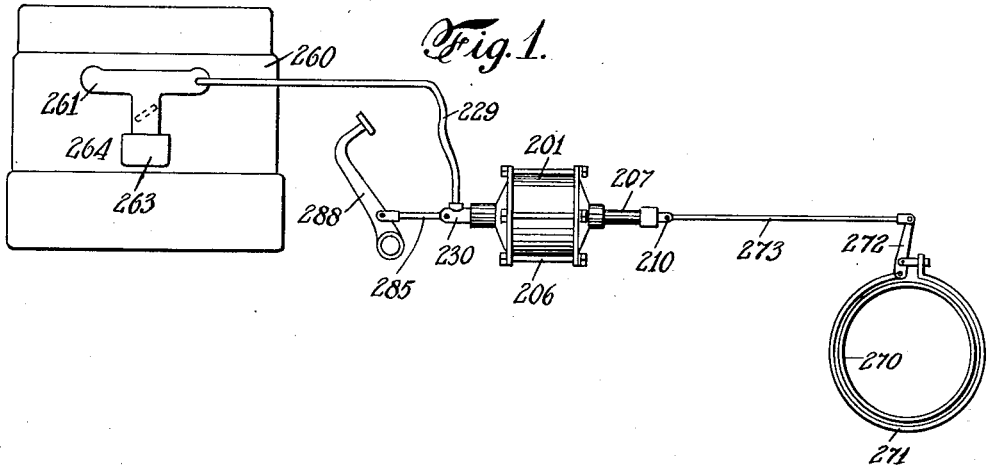
Fig. 1 is a diagrammatic view illustrating our improved actuator installed in an automotive vehicle provided with an internal combustion engine and brake mechanism, and operatively connected therewith for operating the brake mechanism.

Referring to the drawings, 201 represents the cylinder of our improved actuator closed at both ends by heads, 202 and 203, and provided with a piston, 204, having oppositely disposed gaskets, 205, the heads of the cylinder being clamped in position by suitable bolts, 206. The hub of the piston is provided with a piston rod, 207, which projects through a stuffing box, 208, in the head, 203, and is provided at its outer end with means for attaching it to the part to be actuated which may be brake mechanism, clutch mechanism or other part of an automotive vehicle or aircraft. The piston rod is shown provided with a fitting, 209, provided with an air inlet aperture, 211, and an attaching lug, 210, which in the installation diagrammatically illustrated in Fig. 1, is attached by link, 273, with a brake lever, 272, for applying the brake mechanism of an automotive vehicle represented in the diagram by a brake band, 271, and brake drum, 270.

Figure 2:
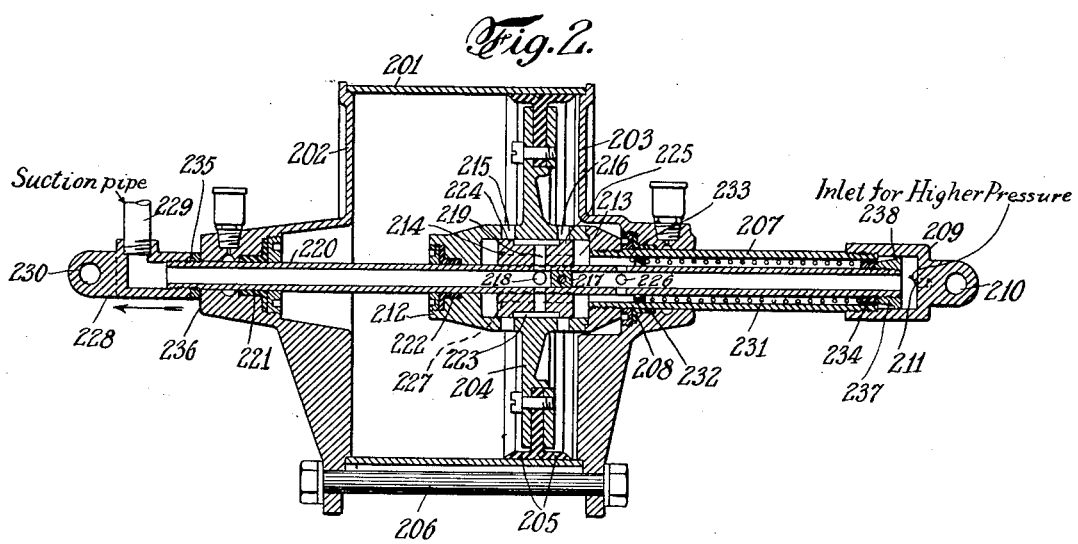
Fig. 2 is an enlarged sectional view of the actuator showing the valve mechanism by means of which a condition of rarification is maintained on both sides of the piston when the parts are in the off or neutral position, and in which the piston is permitted to be moved without opening the pressure ports.
Figure 3:
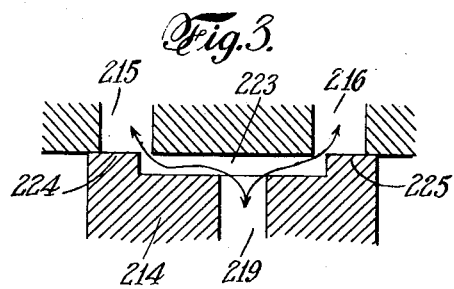
Fig. 3 is an enlarged detail view showing the neutral or normal position of the valve mechanism with respect to the piston ports in the construction illustrated in Fig. 2.
Figure 4:
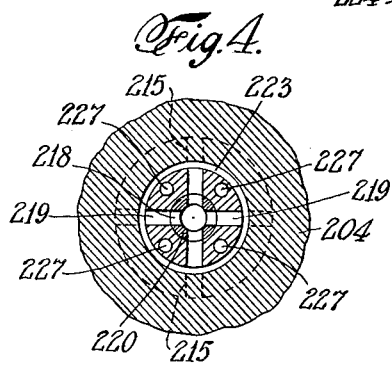
Fig. 4 is an enlarged transverse sectional view of the piston valve, showing the transverse and also the longitudinal passages therein.

The piston hub, 212, is provided internally with a valve chamber, 213, in which is located a piston valve, 214. The hub is provided with ports, 215 and 216, for connecting the valve chamber with the cylinder on opposite sides of the piston. The piston valve is mounted on a valve actuating sleeve, 220, which extends through a stuffing box, 221, in the head, 202, and through a stuffing box, 222, in the adjacent end of the piston hub. Said sleeve also extends through the valve chamber, 213, valve, 214, and preferably through the hollow piston rod and is rigidly secured to the piston valve. Valve actuating sleeve, 220, is provided internally with a plug or partition indicated at 217, which divides its interior space into two compartments one of which (at left Fig. 2.) communicates by ports, 218, and registering passages, 219, in the valve, with an annular recess, 223, formed in the exterior surface of the valve, which we term the suction or outlet chamber. The valve is provided with cylindrical portions, 224 and 225, on opposite sides of the recess, 223, fitting the valve chamber, and so constructed and arranged that when the normal, or neutral position as shown in Fig. 2, both ports, 215 and 216, will be in communication with the suction chamber, 223, thus equalizing pressures in the cylinder on opposite sides of the piston, and connecting both portions of the cylinder with the source of suction.

The other portion of the valve sleeve at the right of partition, 217, (Fig. 2), is in communication with the hollow piston and fitting, 209, and is therefore in communication with the atmosphere through the higher pressure inlet, 211, and said portion of the sleeve is provided with a port or ports, 226, communicating with the adjacent end of the valve chamber, 213, by means of the annular space between the sleeve and the interior of the piston rod. The valve, 214, is provided with one or more longitudinal passages, 227, for connecting the opposite ends of the valve chamber, 213.

The valve actuating sleeve, 220, is provided with means for connecting it with an operator operated part, as the usual foot lever, 288, connected by a rod, 285, with a lug, 230, on a fitting, 228, secured to the sleeve, 220, and provided with a suction pipe, 229, connected with the source of suction. In ordinary installations we prefer to connect the suction pipe, 229, with the intake manifold of the internal combustion engine used for propelling the vehicle, as shown in Fig. 1, in which 260 indicates the engine, 261, the intake manifold connected to the usual carburetor, 262, and provided with the usual throttle valve, 264. The high pressure aperture, 211, is usually connected with the atmosphere, but it is obvious that the aperture, 211, could be connected with a source of pressure above atmospheric, and the pipe, 229, could be connected with the atmosphere, or with the intake manifold, as preferred.

It is not necessary with this type of valve mechanism to employ springs for seating the valve. It is desirable, however, where the actuator is employed for the operation of the brake mechanism of an automotive vehicle to employ a retracting spring for effecting the reversing movement of the valve and the return of the pedal lever and valve sleeve to the normal or off position with the piston when the pedal is released and the brakes relieved. This spring can be applied in the usual manner to the pedal lever, but we prefer to interpose it between the piston and the valve sleeve in order that the pressure exerted by the operator in overcoming this retracting spring may not be lost, but may be transmitted through the spring to the piston and assist in moving it in a direction to apply the brakes. In Fig. 2, for example, we have shown a coil spring, indicated at 231, located between the valve sleeve and the hollow piston rod, 207, and engaging a collar, 232, secured to the piston rod in any desired manner, as by a spring ring, 233, the other end of the spring engaging a collar, 234, screwed on a threaded portion of the valve sleeve, 220. When the piston is in the off or normal position, the hub, 212, thereof will engage the head, 203, of the cylinder, 201, as indicated in Fig. 2, and the valve sleeve, 220, will be arrested by the engagement of an adjustable collar, 235, on the sleeve, with the end of the boss, 236, of the cylinder head, 202, in which the stuffing box, 221, is located, as shown in Fig. 2. There is a limited amount of lost motion between the valve sleeve and the piston, so that if the valve sleeve is moved in either direction, so as to take up this lost motion, the piston may be actuated by the sleeve. The lost motion may be limited by the valve itself, but we prefer to avoid placing this strain on the valve, and therefore have shown, in this instance, the sleeve, 220, extended beyond the end of the hollow piston rod, 207, and provided with a nut, 237, having a flange, 238, adapted to engage the end of the piston rod when the sleeve is moved to the left in Fig. 2. It follows from this construction that when the brake mechanism has been actuated to the fullest extent, the operator can, by further moving the pedal or other manually operated device so as to take up the lost motion between the sleeve and piston, bringing the flange, 238, into engagement with the piston rod, and add his physical force to the power of the actuator in the application of the brakes, and in the same manner he may in case of the failure of power for any reason, apply force to the operator operated part to move the sleeve, 220, in the direction of the arrow in Fig. 2, thereby placing the valves in proper position to vent the cylinder, taking up the lost motion between the piston and the valve actuating sleeve, and positively moving the piston forward to apply the brakes. Obviously when the brake pedal is released, the retracting spring will force the valve sleeve in the opposite direction, and vent the cylinder for the return movement of the piston, which would be effected by the load of the brakes and the retracting mechanism thereof where the device is used in connection with brake mechanisms. In other connections, the piston can likewise be forced rearwardly by the operator operated part, the collar, 237, engaging the rear end of the fitting, 209, when the valve sleeve is moved in a direction opposite that of the arrow in Fig. 2, far enough to take up lost motion.

When the parts are in normal or off position, the piston being arrested by coming into contact with the head, 203, and the valve sleeve being arrested by the collar, 235, engaging the boss, 236, on the head, 202, the valve, 214, will be held in the position indicated in Fig. 2, both of the ports, 215 and 216, leading from the suction chamber, 223, to the cylinder on opposite sides of the piston, will be slightly opened. It follows from this construction that the entire cylinder is in effect constituted a vacuum storage tank or equalizing tank, and the piston is normally maintained submerged in vacuum. When the valve actuating sleeve is moved in the direction of the arrow, Fig. 2, for instance, to apply the brakes, the forward movement of the valve will cut off communication between the ports, 216 and outlet or suction chamber, 223, and connect the cylinder back of the piston with the atmosphere, while the ports, 215, will be fully connected with the suction chamber, thereby effecting the forward movement of the piston to apply the brakes without delivering any material quantity of air to the intake manifold or other source of suction. When the movement of the valve sleeve is reversed, the first effect will be to connect both ports, 215 and 216, with each other and with the suction chamber, 223, thereby producing an equalization of pressures on opposite sides of the piston, and also the exhausting of any air admitted in rear of the piston, permitting the applied brakes to release themselves. The further reverse movement of the valve will connect the ports, 216, with the suction chamber, and the ports, 215, with the atmosphere, through the by-pass, 227, in the valve, and cause the parts to be returned to normal position when the sleeve, 220, will be arrested before the piston comes to rest and the valve will be returned to normal position as the piston comes to rest, in which position both ports, 215 and 216, are connected with each other and with the outlet or suction chamber, 223, again permitting an equalization of pressures on opposite sides of the piston and the withdrawal of air admitted forward of the piston, for the purpose of retracting the same.

As previously set forth the operator can apply his physical force to the piston and connected part to be operated in addition to that of the actuator, and can move the piston in either direction in case of failure of power.

What we claim and desire to secure by Letters Patent is:—

1. In a power actuator, the combination of a cylinder closed at both ends, a double acting piston in said cylinder provided with a cylindrical valve chamber, and with ports connecting said valve chamber with the end portions of the cylinder on both sides of the piston, a reversing piston valve in said valve chamber, provided with cylindrical valve portions, adapted to be brought into registration with said ports and having an outlet chamber intermediate said cylindrical valve portions, said outlet chamber adapted to be brought into substantial registration with the ports for one or other of the end portions of the cylinder, means for connecting the piston with a part to be actuated, a valve sleeve extending through one end of the cylinder, and connected with said valve for operating the same, the interior of said sleeve being in communication with the said outlet chamber of the reversing valve, said sleeve being provided with means for connecting it to an operator operated part, means for connecting the interior of said sleeve with a lower pressure outlet, and means for admitting higher pressure fluid to the end portions of the valve chamber, adjacent to the opposite ends of said reversing piston valve, the cylindrical valve portions and outlet chamber of said valve being so located with respect to the piston ports as to place the piston ports on opposite sides of the piston in communication with each other and with said outlet chamber, when the valve is in neutral position.

2. In a power actuator, the combination of a cylinder closed at both ends, a double acting piston in said cylinder, provided with a cylindrical valve chamber, and with ports connecting said valve chamber with the end portions of the cylinder on both sides of the piston, a reversing piston valve in said valve chamber, provided with cylindrical valve portions adapted to be brought into registration with said ports and having an outlet chamber intermediate said cylindrical valve portions, said outlet chamber adapted to be brought into substantial registration with the ports for one or other of the end portions of the cylinder, means for connecting the piston with the parts to be actuated, a valve sleeve extending through one end of the cylinder, and connected with said valve for operating the same, the interior of said sleeve being in communication with the said outlet chamber of the reversing valve, said sleeve being provided with means for connecting it to an operator operated part, means for connecting the interior of said sleeve with a lower pressure outlet, and means for admitting higher pressure fluid to the end portions of the valve chamber, adjacent to the opposite ends of said reversing piston valve, the cylindrical valve portions being so located with respect to the piston ports, on opposite sides of the piston as to only partially close both of said ports, leaving them open at at least one side of each of said cylindrical valve portions when the valve is in neutral position.

3. In a power actuator, the combination of a cylinder closed at both ends, a double acting piston in said cylinder provided with a cylindrical valve chamber, and with ports connecting said valve chamber with the end portions of the cylinder on both sides of the piston, a reversing piston valve in said valve chamber, provided with cylindrical valve portions adapted to be brought into registration with said ports and having an outlet chamber intermediate said cylindrical valve portions, said outlet chamber adapted to be brought into substantial registration with the ports for one or other of the end portions of the cylinder, means for connecting the piston with the parts to be actuated, a valve sleeve extending through one end of the cylinder, and connected with said valve for operating the same, the interior of said sleeve being in communication with the said outlet chamber of the reversing valve, said sleeve being provided with means for connecting it to an operator operated part, means for connecting the interior of said sleeve with a lower pressure outlet, and means for admitting higher pressure fluid to the end portions of the valve chamber, adjacent to the opposite ends of said reversing piston valve, the cylindrical valve portions and outlet chamber of said valve being so located with respect to the piston ports as to place the piston ports on opposite sides of the piston in communication with each other and with said outlet chamber, when the valve is in normal or neutral position, means for arresting the piston when in retracted position, and means for arresting the valve in position to connect the piston ports on opposite sides of the piston with each other and with the outlet chamber when the piston is in retracted position.

4. In an automotive vehicle provided with an internal combustion engine having a suction passage and a part to be actuated, the combination of a power actuator comprising a cylinder closed at both ends, a double acting piston in the cylinder, having its hub provided with a valve chamber, and ports communicating therewith and with the cylinder on opposite sides of the piston, a reversing piston valve in said valve chamber, movable with and with respect to the piston, and provided with cylindrical portions for closing said ports respectively, and with an intermediate suction chamber, said ports and the cylindrical portions of the valve being so located as to place the ports communicating with the cylinder on opposite sides of the piston in communication with each other, to equalize pressures, and also in communication with said suction chamber, to exhaust the cylinder on both sides of the piston when the valve is in neutral position, means for connecting said suction chamber with the suction passage of the engine, means for admitting higher pressure fluid to the end portions of the valve chamber, means for connecting the piston with the part to be operated, and an operator operated part connected with said piston valve.

5. In an automotive vehicle provided with an internal combustion engine having a suction passage and a part to be actuated, the combination of a power actuator comprising a cylinder closed at both ends, a double acting piston in the cylinder having its hub provided with a valve chamber, and ports communicating therewith and with the cylinder on opposite sides of the piston, a reversing piston valve in said valve chamber, movable with and with respect to the piston, and provided with cylindrical portions for closing said ports respectively, and with an intermediate suction chamber, said ports and the cylindrical portions of the valve being so located as to place the ports communicating with the cylinder on opposite sides of the piston in communication with each other, to equalize pressure, and also in communication with said suction chamber, to exhaust the cylinder on both sides of the piston when the valve is in neutral position, means for connecting said suction chamber with the suction passage of the engine, means for admitting higher pressure fluid to the end portions of the valve chamber, means for connecting the piston with the part to be operated, and an operator operated part connected with said piston valve, and means for holding the piston valve in its said neutral position when the piston is in retracted position, to normally maintain the piston submerged in vacuum, whereby the piston may be operated in a direction away from its retracted position without admitting appreciable quantities of air into the suction passage of the engine, to prevent stalling of the engine or interference with its operation.

6. In an automotive vehicle provided with an internal combustion engine having a suction passage and a part to be actuated, the combination of a power actuator comprising a cylinder closed at both ends, a double acting piston in the cylinder, having its hub provided with a valve chamber, and ports communicating therewith and with the cylinder on opposite sides of the piston, a reversing piston valve in said valve chamber, movable with and with respect to the piston, and provided with cylindrical portions for closing said ports respectively, and with an intermediate suction chamber, said ports and the cylindrical portions of the valve being so located as to place the ports communicating with the cylinder on opposite sides of the piston in communication with each other, to equalize pressures, and also in communication with said suction chamber, to exhaust the cylinder on both sides of the piston when the valve is in neutral position, means for connecting said suction chamber with the suction passage of the engine, means for admitting higher pressure fluid to the end portions of the valve chamber, means for connecting the piston with the part to be operated, and an operator operated part connected with said piston valve, means for arresting the piston when in retracted position, so as to hold the valve in the said neutral position, and normally maintain the piston submerged in vacuum, whereby the piston may be operated in a direction away from its retracted position without admitting appreciable quantities of air into the suction passage of the engine, to prevent stalling of the engine or interference with its operation.

7. In an automotive vehicle provided with an internal combustion engine having a suction passage, brake mechanism for the vehicle, the combination of a power actuator comprising a cylinder closed at both ends, a double acting piston in the cylinder having its hub provided with a valve chamber and ports communicating therewith and with the cylinder on opposite sides of the piston, a reversing piston valve in said valve chamber, movable with and with respect to the piston, and provided with cylindrical portions for closing said ports respectively, and with an intermediate suction chamber, said ports and the cylindrical portions of the valve being so located as to place the ports communicating with the cylinder on opposite sides of the piston in communication with each other to equalize pressure, and permit the brake mechanism to relieve itself without admitting higher pressure fluid on the forward side of the piston, when desired, and also placing said ports in communication with said suction chamber, to exhaust the cylinder on both sides of the piston, when the valve is in neutral position, a valve actuating sleeve extending through one end of the cylinder and through the piston and valve chamber and secured to said valve, means for connecting the interior of said sleeve with the said suction chamber and with the suction passage of the engine, means for admitting higher pressure fluid to the valve chamber at opposite ends of the piston valve, an operator operated part connected with said sleeve, and means for connecting the piston with the brake mechanism.

8. In an automotive vehicle provided with an internal combustion engine having a suction passage, and brake mechanism for the vehicle, the combination of a power actuator comprising a cylinder closed at both ends, a double acting piston in the cylinder having its hub provided with a valve chamber and ports communicating therewith and with the cylinder on opposite sides of the piston, a reversing piston valve in said valve chamber, movable with and with respect to the piston, and provided with cylindrical portions for closing said ports respectively, and with an intermediate suction chamber, said ports and the cylindrical portions of the valve being so located as to place the ports communicating with the cylinder on opposite sides of the piston in communication with each other, to equalize pressures and permit the brake mechanism to relieve itself without admitting higher pressure fluid on the forward side of the piston, when desired, and also placing said ports in communication with said suction chamber, to exhaust the cylinder on both sides of the piston, when the valve is in neutral position, a valve actuating sleeve extending through one end of the cylinder, and through the piston and valve chamber, and secured to said valve, means for connecting the interior of said sleeve with the said suction chamber, and with the suction passage of the engine, means for admitting higher pressure fluid to the valve chamber at opposite ends of the piston valve, an operator operated part connected with said sleeve, and means for connecting the piston with the brake mechanism, means for arresting the piston in its retracted position, and means for arresting the valve actuating sleeve in position to hold the valve in its neutral position, and normally maintain the piston submerged in vacuum, when the piston is in retracted position, whereby the brakes may be applied without admitting appreciable quantities of air to the suction passage of the engine, and preventing the stalling of the engine if idling, or interference with its operation.

9. In an automotive vehicle provided with an internal combustion engine having a suction passage, and a part to be actuated, the combination of a power actuator comprising a cylinder closed at both ends, a double acting piston in the cylinder having its hub provided with a valve chamber and ports communicating therewith and with the cylinder on opposite sides of the piston, a reversing piston valve in said valve chamber, movable with and with respect to the piston, and provided with cylindrical portions for closing said ports respectively, and with an intermediate suction chamber, said ports and the cylindrical portions of the valve being so located as to place the ports communicating with the cylinder on opposite sides of the piston in communication with each other, to equalize pressure, and also in communication with said suction chamber, to exhaust the cylinder on both sides of the piston when the valve is in neutral position, a valve actuating sleeve extending through one end of the cylinder, and through the piston and valve chamber, and secured to said valve, means for connecting the interior of said sleeve with the said suction chamber, and with the suction passage of the engine, means for admitting higher pressure fluid to the valve chamber at opposite ends of the piston valve, an operator operated part connected with said sleeve, and means for connecting the piston with the part to be operated, a retracting spring for the valve actuating sleeve, means for arresting the piston in its retracted position, and independent means for arresting said sleeve before the piston is arrested, to effect relative movement between the sleeve and valve and the piston, and move the valve into said neutral position, to maintain the piston normally submerged in vacuum, whereby the piston may be operated in a direction away from its retracted position without admitting appreciable quantities of air to the suction passage, and preventing the stalling of the engine or interference with its operation.

10. In a power actuator, the combination of a cylinder closed at both ends, a double acting piston in said cylinder provided with a cylindrical valve chamber, and with ports connecting said valve chamber with the end portions of the cylinder on both sides of the piston, a reversing valve in said valve chamber, provided with cylindrical valve portions adapted to be brought into registration with said ports and having an outlet chamber intermediate said cylindrical valve portions, adapted to be brought into substantial registration with the ports for one or other of the end portions of the cylinder, means for connecting the piston with the parts to be actuated, a valve sleeve extending through one end of the cylinder, and connected with said valve for operating the same, the interior of said sleeve being in communication with the said outlet chamber of the reversing valve said sleeve being provided with means for connecting it to an operator operated part, means for connecting the interior of said sleeve with a lower pressure outlet, and means for admitting higher pressure fluid to the end portions of the valve chamber, adjacent to the opposite ends of said reversing piston valve, the cylindrical valve portions and outlet chamber of said valve being so located with respect to the piston ports as to place the piston ports on opposite sides of the piston in communication with each other and with said outlet chamber, when the valve is in neutral position, said operator operated part being connected with the piston by means permitting lost motion, to permit the physical strength of the operator to be added to the force of the piston, or to effect the movement of the piston in case of failure of power.

11. In an automotive vehicle provided with an internal combustion engine having a suction passage, and brake mechanism for the vehicle, the combination of a power actuator comprising a cylinder closed at both ends, a double acting piston in the cylinder having its hub provided with a valve chamber and ports communicating therewith and with the cylinder on opposite sides of the piston, a reversing piston valve in said valve chamber, movable with and with respect to the piston, and provided with cylindrical portions for closing said ports respectively, and with an intermediate suction chamber, said ports and the cylindrical portions of the valve being so located as to place the ports communicating with the cylinder on opposite sides of the piston in communication with each other, to equalize pressures, and permit the brake mechanism to relieve itself without admitting higher pressure fluid, and also placing said ports in communication with said suction chamber, to exhaust the cylinder on both sides of the piston, when the valve is in neutral position, a valve actuating sleeve extending through one end of the cylinder, and through the piston and valve chamber, and secured to said valve, means for connecting the interior of said sleeve with the said suction chamber, and with the suction passage of the engine, means for admitting higher pressure fluid to the valve chamber at opposite ends of the piston valve, an operator operated part connected with said sleeve, and means for connecting the piston with the brake mechanism, said operator operated part being connected with the piston by means providing lost motion to enable the operator to add his physical force to that of the piston, or to operate the piston and brakes in case of failure of power.

12. In an automotive vehicle provided with an internal combustion engine having a suction passage, and brake mechanism for the vehicle, the combination of a power actuator comprising a cylinder closed at both ends, a double acting piston in the cylinder having its hub provided with a valve chamber and ports communicating therewith and with the cylinder on opposite sides of the piston, a reversing piston valve in said valve chamber, movable with and with respect to the piston, and provided with cylindrical portions for closing said ports respectively, and with an intermediate suction chamber, said ports and the cylindrical portions of the valve being so located as to place the ports communicating with the cylinder on opposite sides of the piston in communication with each other, to equalize pressures, and permit the brake mechanism to relieve itself without admitting higher pressure fluid forward of the piston, when desired, and also placing said ports in communication with said suction chamber, to exhaust the cylinder on both sides of the piston when the valve is in neutral position, a valve actuating sleeve extending through one end of the cylinder, and through the piston and valve chamber and secured to said valve, means for connecting the interior of said sleeve with the said suction chamber, and with the suction passage of the engine, means for admitting higher pressure fluid to the valve chamber at opposite ends of the piston valve, an operator operated part connected with said sleeve, and means for connecting the piston with the brake mechanism for the vehicle, means for arresting the piston in its retracted position, and means for arresting the valve actuating sleeve in position to hold the valve in its neutral position, and normally maintain the piston submerged in vacuum, to permit the piston to be operated to apply the brakes without admitting appreciable quantities of air to the suction passage to prevent stalling the engine if idling, or interference with the operation, said operator operated part being connected with the piston by means providing lost motion, whereby the operator may add his physical force to that of the piston, or operate the piston and brake mechanism in case of failure of power.

13. In an automotive vehicle provided with an internal combustion engine having a suction passage and brake mechanism for the vehicle, the combination of a power actuator comprising a cylinder closed at both ends, a double acting piston in the cylinder operatively connected with the brake mechanism, and valve mechanism comprising a valve chamber operatively connected with the piston and movable with and provided with ports communicating with the cylinder on opposite sides of the piston, a reversing piston valve in said valve chamber movable with and with respect to said valve chamber, and provided with cylindrical portions for closing said ports respectively, and with an intermediate suction chamber, said ports and the cylindrical portions of the valve being so located as to place the ports communicating with the cylinder on opposite sides of the piston in communication with each other and with the suction chamber when the valve is in neutral position to permit the brake mechanism to relieve itself without admitting higher pressure fluid forward of the piston, when desired, means for connecting the suction chamber with the suction passage of the engine, means for connecting the end portions of the suction chamber with a source of higher pressure fluid, and an operator operated part connected with said valve.

14. In an automotive vehicle provided with an internal combustion engine having a suction passage and brake mechanism for the vehicle, the combination of a power actuator comprising a cylinder closed at both ends, a double acting piston in the cylinder operatively connected with the brake mechanism, and valve mechanism comprising a valve chamber operatively connected with and movable with the piston and provided with ports communicating with the cylinder on opposite sides of the piston, a reversing piston valve in said valve chamber movable with and with respect to said valve chamber, and provided with cylindrical portions for closing said ports respectively, and with an intermediate suction chamber, said ports and the cylindrical portions of the valve being so located as to place the ports communicating with the cylinder on opposite sides of the piston in communication with each other and with the suction chamber when the valve is in neutral position to permit the brake mechanism to relieve itself without admitting higher pressure fluid forward of the piston, when desired, means for connecting the suction chamber with the suction passage of the engine, means for connecting the end portions of the suction chamber with a source of higher pressure fluid, an operator operated part connected with said valve, means for arresting the piston in retracted position, and means for holding said valve in neutral position when the piston is in retracted position to permit the piston to be operated to apply the brakes without admitting appreciable quantities of air to the suction passage to prevent stalling the engine if idling, or interference with its operation.

15. In an automotive vehicle provided with an internal combustion engine having a suction passage and brake mechanism for the vehicle, the combination of a power actuator comprising a cylinder closed at both ends, a double acting piston in the cylinder operatively connected with the brake mechanism, and valve mechanism comprising a valve chamber operatively connected with and movable with the piston and provided with ports communicating with the cylinder on opposite sides of the piston, a reversing piston valve in said valve chamber movable with and with respect to said valve chamber, and provided with cylindrical portions for closing said ports respectively, and with an intermediate suction chamber, said ports and the cylindrical portions of the valve being so located as to place the ports communicating with the cylinder on opposite sides of the piston in communication with each other and with the suction chamber when the valve is in neutral position to permit the brake mechanism to relieve itself without admitting higher pressure fluid forward of the piston, when desired, means for connecting the suction chamber with the suction passage of the engine, means for connecting the end portions of the suction chamber with a source of higher pressure fluid, an operator operated part connected with said valve, and operative connections between the operator operated part and the piston to enable the operator to add his physical force to that of the piston or to operate the piston and brakes in case of failure of power.

16. In an automotive vehicle provided with an internal combustion engine having a suction passage and brake mechanism for the vehicle, the combination of a power actuator comprising a cylinder closed at both ends, a double acting piston in the cylinder operatively connected with the brake mechanism, and valve mechanism comprising a valve chamber operatively connected with and movable with the piston and provided with ports communicating with the cylinder on opposite sides of the piston, a reversing piston valve in said valve chamber movable with and with respect to said valve chamber, and provided with cylindrical portions for closing said ports respectively, and with an intermediate suction chamber, said ports and the cylindrical portions of the valve being so located as to place the ports communicating with the cylinder on opposite sides of the piston in communication with each other and with the suction chamber when the valve is in neutral position to permit the brake mechanism to relieve itself without admitting higher pressure fluid forward of the piston, when desired, means for connecting the suction chamber with the suction passage of the engine, means for connecting the end portions of the suction chamber with a source of higher pressure fluid, an operator operated part connected with said valve, means for arresting the piston in retracted position, means for holding said valve in neutral position when the piston is in retracted position, to permit the piston to be operated to apply the brakes without admitting appreciable quantities of air to the suction passage to prevent stalling the engine if idling, or interference with its operation, and connections between the operator operated part and the piston containing the provision for lost motion to enable the operator to add his physical force to that of the piston or to operate the piston and brakes in case of failure of power.

17. In a power actuator, the combination of a cylinder closed at both ends, a double-acting piston in said cylinder, a valve chamber having ports connected with the end portions of the cylinder on both sides of the piston, a reversing valve in said valve chamber provided with cylindrical valve portions adapted to be brought into registration with said ports and having an outlet chamber intermediate said cylindrical valve portions, said outlet chamber adapted to be brought into substantial registration with the ports for one or other of the end portions of the cylinder, means for connecting the piston with a part to be actuated, a valve sleeve extending through the valve chamber and connected with said valve for operating the same, a communicating connection between the interior of said sleeve and said outlet chamber, said sleeve being provided with means for connecting it to an operator operated part, means for connecting said sleeve with a lower pressure outlet and means for admitting higher pressure fluid to the end portions of the valve chamber adjacent to the opposite ends of said reversing valve, the cylindrical portions and outlet chamber of said valve being so located with respect to said ports as to place said ports on opposite sides of the piston in communication with each other and with said outlet chamber when the valve is in neutral position.

In testimony whereof we affix our signatures.

CALEB S. BRAGG.
VICTOR W. KLIESRATH.